United States Patent

[11] 3,630,845

[72] Inventors Robert G. Dworschack;
Carolyn A. Nelson, both of Clinton, Iowa
[21] Appl. No. 765,642
[22] Filed Oct. 7, 1968
[45] Patented Dec. 28, 1971
[73] Assignee Standard Brands Incorporated
New York, N.Y.

[54] PROCESS FOR PREPARING DEXTROSE CONTAINING SYRUPS
10 Claims, No Drawings

[52] U.S. Cl. ........................................................ 195/31
[51] Int. Cl. ........................................................ C12b 1/00
[50] Field of Search ........................................... 195/31, 121, 122, 123; 99/141, 142

[56] References Cited
UNITED STATES PATENTS

| | | | |
|---|---|---|---|
| 3,137,639 | 6/1964 | Hurst et al. ................... | 195/31 |
| 3,149,049 | 9/1964 | Walkup et al. ................. | 195/31 |
| 3,513,072 | 5/1970 | Frankevicz et al. ........... | 195/31 |

OTHER REFERENCES

Cravens, Tappi, p. 53A–55A, Vol. 49, No. 8, 1966.

*Primary Examiner*—A. Louis Monacell
*Assistant Examiner*—Gary M. Nath
*Attorney*—Aaron B. Karas

ABSTRACT: The invention is directed to a process for preparing dextrose containing syrups having a predictable dextrose content. During enzymatic hydrolysis of starch to dextrose, $ClO_2$ is incorporated into the hydrolysate to inactivate the enzyme when the dextrose content of the hydrolysate reaches a predetermined level.

PROCESS FOR PREPARING DEXTROSE CONTAINING SYRUPS

THE INVENTION

The present invention relates to a process for preparing dextrose containing syrups. More particularly, the present invention relates to a method of producing dextrose containing syrups having a substantially predictable dextrose content.

The major use of dextrose containing syrups is in food processing, for instance in the baking, beverage, cannery and confectionery industries, to provide sweetness, body, to regulate crystal growth, etc. The specific types of dextrose containing syrup used by these industries depends, of course, upon the properties desired in the foods which they produce. For instance, when it is desired to provide body to a food, generally, a dextrose containing syrup will be used which contains relatively large amounts of dextrins. The baking industry, on the other hand, is desirous of obtaining dextrose containing syrups having large amounts of dextrose present so that the fermentability of the syrup dry substance is high. In the use of such syrups it is important that they be noncrystallizing in order that they can be pumped and otherwise handled in a manner normal to the industry. Maltose is sometimes provided in the syrups along with dextrose in order to increase the fermentability of the dry substance while still providing noncrystallizing syrups. The maximum amount of dextrose which may be present in syrups is limited by its solubility. In syrups having a dextrose content of above about 45 percent some of the dextrose will crystallize out of solution under normal conditions.

Dextrose containing syrups are produced by hydrolyzing starch. The components of starch hydrolysates may generally be grouped into five categories. These are dextrose, a monosaccharide; maltose, a disaccharide; trisaccharides; oligosaccharides and dextrins. The chemical and physical properties of dextrose containing syrups, and of course the use to which these syrups are put, are primarily dependent upon their content of the five principal components. The amounts of the five principal components may be varied widely and is principally dependent upon the method and extent of hydrolysis of the starch.

Methods of producing dextrose containing syrups are well known in the art. Two methods disclosed in the art are acid-enzyme and enzyme-enzyme processes. In the acid-enzyme conversion process, starch is first partially hydrolyzed or liquefied, for instance, by forming an aqueous suspension containing about 35 to 40 percent starch and incorporating therein an acid such as hydrochloric. The suspension is then heated to high temperatures thereby partially hydrolyzing the starch. The suspension may be cooled and treated with a gluoamylase preparation at a suitable concentration and pH range to enzymatically convert the partially hydrolyzed starch to dextrose. The acid-enzyme process is disclosed, for instance, in U.S. Pat. Nos. 2,305,168; 2,531,999; 2,893,921; and 3,042,584.

Alpha- and beta-amylases derived, for example, from malted cereal grains may be added to the partially acid hydrolyzed starch along with glucoamylase to enzymatically convert a portion of the starch to maltose when it is desired to produce dextrose containing syrups having present substantial amounts of maltose.

In the enzyme-enzyme conversion process, generally, a starch slurry is formed and a starch liquefying enzyme, for instance bacterial alpha-amylase, added, and the starch slurry heated to partially hydrolyze the starch. The partial hydrolysis is generally carried out at a temperature in the range of 80° to 90° C. The DE of the slurry after the partial hydrolysis may be in the range of from 10 to 20.

Any suitable starch liquefying enzyme may be used to partially hydrolyze the starch. Exemplary of such hydrolyzing enzymes are those produced by the members of the *Bacillus subtilis* species, *Aspergillus niger* and other species of the Aspergillus genus and by malted cereal grains.

The partially hydrolyzed starch slurry or liquefied starch may be treated with a glucoamylase preparation to convert the starch to dextrose. When it is desired, the partially hydrolyzed starch slurry may first be treated with alpha- and beta-amylases from sources such as malted cereal grains to convert the starch to maltose and then this hydrolysate may be treated with a glucoamylase preparation to convert a minor or major portion of the maltose to dextrose.

The enzymatically converted hydrolysates are subjected to various refining procedures well known in the art to remove colored bodies, odoriferous materials and constituents which contribute to the ash content of the syrup.

In the art, the term "hydrolysates" usually connotes unrefined dextrose containing syrups whereas after refining the dextrose containing syrups are termed "syrups".

In commercial practice, it may sometime take 8 to 24 hours or longer, depending upon the refining conditions and the physical setup of the equipment used, to completely refine a starch hydrolysate. During this period of time, the hydrolyzing enzyme, for instance glucoamylase, present in the hydrolysates will continue to hydrolyze the polysaccharide materials therein thereby increasing the dextrose content of the same. Because of this, it is difficult to produce dextrose containing syrups having present predictable quantities of dextrose. This problem has been overcome in the past by lowering the pH of the hydrolysate and/or raising the temperature thereof to inactivate the enzymes. These methods are not entirely satisfactory since, for instance, lowering the pH of the hydrolysate will contribute to the ash content of the hydrolysate when it is subsequently neutralized with an alkali and high temperatures tend to cause further color development.

It is the principal object of the present invention to provide an enzymatic method for producing dextrose containing syrups having a substantially predictable dextrose content.

This object and other objects of the present invention, which will be apparent from the following description, may be attained by liquefying starch, incorporating into the liquefied starch a dextrose forming enzyme, subjecting the liquefied starch containing the dextrose forming enzyme to starch hydrolyzing conditions to provide a hydrolysate containing a substantially predictable dextrose content, treating the hydrolysate with a sufficient amount of $ClO_2$ to substantially inactivate the dextrose forming enzyme and refining the treated hydrolysate to provide a dextrose containing syrup. The term "starch" as used herein includes all raw starches such as corn, tapioca, wheat, arrowroot, rice and the like.

The amount of chlorine dioxide necessary to substantially inactivate the dextrose forming enzymes is dependent upon many factors, such as the exact process used to prepare the hydrolysate, the temperature, the pH, the amount of proteinaceous materials present, and the type and amount of enzyme used. At relatively high temperatures and outside the pH range in which optimum enzyme activity occurs, lesser amounts of chlorine dioxide are required than at lower temperatures and at a pH range within which optimum enzyme activity occurs. In order to inactivate glucoamylase produced by *Aspergillus niger*, it is preferred that the temperature of the hydrolysate be within a range of from about 40° to about 70° C. and most preferably be within a range of about 50° to about 60° C. The pH of the hydrolysate during inactivation of the glucoamylase may be in the range of from about 2.5 to about 4.5 and preferably at about 3. Generally within the preferred pH and temperature ranges from about 100 to about 150 p.p.m., chlorine dioxide based on the weight of the dry substance present in the hydrolysate will substantially inactivate the glucoamylase.

The chlorine dioxide may be provided in the hydrolysate by introducing gaseous $ClO_2$, a water solution of $ClO_2$, a salt of chlorous acid or a combination of sodium chlorite and a peroxygen compound such as hydrogen peroxide, sodium peroxide and sodium percarbonate.

In a preferred embodiment of the present invention, liquefied starch is enzymatically converted to a high fermentable hydrolysate, for instance having a dextrose content of from about 40 to about 45 percent and a maltose content of from about 40 to about 45 percent. This enzymatic conversion may be accomplished by first treating a starch slurry with a starch liquefying enzyme and then with enzymes which produce maltose, for instance by the addition of distillers' barley malt, to obtain a high content of maltose, generally in the range of from about 50 to about 65 percent. Then a glucoamylase preparation, such as one derived from *Aspergillus niger*, is added and conversion allowed to proceed until a predetermined amount of dextrose is formed in the hydrolysate. $ClO_2$ is then provided in the hydrolysate in order to inactivate the enzymes. Typically, the $ClO_2$ is provided in the hydrolysate when a level of from about 40 to about 45 percent dextrose and from about 40 to about 45 percent maltose is reached. Preferably, the glucoamylase should be inactivated when the dextrose content of the hydrolysate reaches a level of from about 43 to about 45 percent. These hydrolysates may be filtered, refined and concentrated to obtain high fermentable syrups. As discussed previously, high fermentable syrups find particular application in the baking industry. The most desirable syrups for the baking industry from the standpoint of handling are those having a maximum dextrose content at or below that at which dextrose will crystallize out of solution.

In order to more clearly describe the nature of the present invention, specific examples will hereinafter be described. It should be understood, however, that this is done solely by way of example and is intended to neither delineate the scope of the invention nor limit the ambit of the appended claims. In the examples and throughout the specification, percentages refer to percent by weight and are based upon the dry substance present unless otherwise specified.

The analytical procedures and testing methods referred to in this specification were performed by the following procedures:

Determination of Glucoamylase Activity

Exactly 25 g. of soluble starch (Merck Lintner Starch—Special for Diastatic Power Determination) was heated, with stirring, in 700 ml. of distilled water until boiling and then held at this temperature for 5 minutes. The starch preparation was cooled to ambient temperature with constant stirring, the pH adjusted to 4.3±0.1 with 20 ml. of a 1.0 molar solution of sodium acetate, (pH adjusted to 4.3 with acetic acid) and diluted to 1000 ml. with distilled water. Then 100 ml. of this starch substrate was pipetted into a 250 ml. Erlenmeyer flask, stoppered and attempered at 60° C. for 15 minutes in a constant temperature water bath. The enzyme preparation was diluted by transferring 50 ml. of the preparation to a 2000-ml. volumetric flask and making up to volume. A 3-ml. aliquot of the diluted enzyme solution was added to the starch substrate, mixed thoroughly, stoppered, and held in a water bath maintained at 60° C. for exactly 1 hour. At the end of 1 hour, 5 ml. of a 5 percent sodium hydroxide solution was added to the flask to terminate the enzyme action. The enzymatically converted hydrolysate was cooled to about 30° C.

Ten ml. of the hydrolysate was pipetted into a Fehling's titration flask containing 25 ml. of boiling Fehling's solution. The titration with standard dextrose solution was completed using methylene blue as an indicator. A blank determination using 3 ml. of distilled water in place of the enzyme preparation was performed in the manner described above. The activity was calculated as follows:

$$\text{Glucoamylase units/g.} = \frac{(B-D)(S)(T)(E)}{(F)(G)(H)(W)}$$

where:

B. = ml. of standard dextrose solution required for the control.
D = ml. of standard dextrose solution required for the enzymatically converted hydrolysate,
S = g. of dextrose per ml. of standard dextrose solution (0.005).
T = final volume of enzymatically converted hydrolysate (108 ml.)
E = volume, ml. of diluted enzyme solution (2000—except with enzyme preparation of 0 to 3 potency in which the final dilution is 1000 ml.)
F = volume, ml. of enzymatically converted hydrolysate titrated with Fehling's solution (10).
G = reaction time in hours (1).
H = volume, ml. of diluted enzyme solution added to the substrate-buffer solution (3).
W = weight in g. of enzyme preparation used.

Determination of the Composition of the Syrups

The composition of the syrups described herein were determined according to the chromatographic procedures described by L. D. Ough in *Methods in Carbohydrate Chemistry*, 4, pp. 91–98 (1964), Academic Press, New York.

Definition of Dextrose Equivalent

The abbreviation, DE, contained herein refers to "dextrose equivalent" and is defined as the reducing sugars expressed as dextrose and calculated as a percentage of the dry substance. The analysis was performed according to Method E-26 in the Standard Analytical Methods of the Member Companies of the Corn Industries Research Foundation.

EXAMPLE I

This example illustrates the use of various amounts of $ClO_2$ to substantially inactivate glucoamylase in cornstarch hydrolysates having various pH's.

A slurry of cornstarch (about 29.6 percent dry substance) was liquefied with *Bacillus subtilis* alpha-amylase at 88° C. and at a pH 6.8 to 7.0. The liquefied starch slurry was autoclaved, the temperature of the slurry lowered to 55° C. and the pH adjusted to 5.7. One percent ground distillers' malt was added to the slurry, and hydrolysis carried out for 21 hours. A glucoamylase preparation produced by a culture of *Aspergillus awamorii* was then added at a level of 3 glucoamylase units per 100 g. of substrate dry basis. The temperature was maintained at 55° C. for an additional 48 hours at which time the DE was 66.3 and the pH was 4.4.

The hydrolysate was divided into three 400 ml. portions. The pH of two of the portions was adjusted with a dilute $H_2SO_4$ solution to 3.0 and 3.5, respectively. The pH of the third portion was not adjusted. Each of the three portions was next divided into 4 portions of 100 ml. One of the 100 ml. portions at each pH level served as a control. Into each of the other portions were introduced various amounts of $ClO_2$ shown in table I below. After the introduction of the $ClO_2$, the hydrolysates were placed in a 55° C. water bath for 24 hours and the DE determined. The DE's are shown in table I.

TABLE I

| pH | DE of hydrolysate[1] | ClO₂ None (DE) | 60 p.p.m. (DE) | 150 p.p.m. (DE) | 300 p.p.m. (DE) |
|---|---|---|---|---|---|
| 4.4 | 66.3 | | | | |
| 4.4 | 66.3 | 75.8 | 74.8 | 73.5 | 69.7 |
| 3.5 | 66.3 | | 74.1 | 70.4 | 67.8 |
| 3.0 | 66.3 | 74.4 | 73.7 | 68.2 | 67.5 |

[1] Prior to 25 hours in water bath at 55° C.

From the above table, it is apparent that as the amount of $ClO_2$ introduced was increased the glucoamylase was inactivated to a greater degree.

EXAMPLE II

This example illustrates that certain agents which are generally considered to be enzyme inactivators do not substantially inactivate glucoamylase.

An acidified cornstarch slurry containing about 35 percent dry substance was converted under 40 p.s.i.g. steam pressure until the DE of the slurry reached 48. The pH of the converted liquor was adjusted to 4.6 with $Na_2CO_3$. The insoluble materials were removed by skimming and filtration. The filtrate was concentrated under vacuum to about 55 percent solids. The temperature of the filtrate was adjusted to 55° C., the pH adjusted to 5 with a dilute solution of NaOH and 0.35 percent Dextrinase A (marketed by Miles Chemical Co.) was added. The filtrate was hydrolyzed at 55° C. for 47 hours. This hydrolysate which had a DE of 68 was divided into 6 portions and 5 portions treated with the agents shown below in table II. The remaining portion served as a control. These portions were maintained at 55° C. for 91 hours, and the DE of the portions determined. Another hydrolysate was prepared in the same manner as described above except that it was maintained at 55° C. for 45 hours and the DE thereof was 70.8. This was divided into 4 portions and into 3 of the portions were added various amounts of $H_2O_2$. The remaining portion served as a control. These were maintained at 55° C. for 90 hours and the DE of the portions determined. The results of this experiment are shown in tables II and III.

TABLE II

| Agent | pH | DE after 47 hours | DE after 138 hours | DE Increase |
|---|---|---|---|---|
| Control | 5.0 | 68.0 | 78.5 | 10.5 |
| 1.0% Sarkosyl* | 5.0 | 68.0 | 79.6 | 11.6 |
| 0.05% NaOCl | 5.0 | 68.0 | 79.0 | 11.0 |
| 0.5% NaOCl | 5.0 | 68.0 | 68.3 | 0.3 |
| Adjusted with HCl | 3.0 | 68.0 | 79.2 | 11.2 |
| Adjusted with $H_3PO_4$ | 3.0 | 68.0 | 80.0 | 12.0 |

*N-acyl sarcosine surfactant, Geigy Industrial Chemicals.

TABLE III

| Agent | pH | DE after 45 hours | DE after 135 hours | DE Increase |
|---|---|---|---|---|
| Control | 5.0 | 70.8 | 78.4 | 7.6 |
| 0.013% $H_2O_2$ | 5.0 | 70.8 | 77.8 | 7.0 |
| 0.025% $H_2O_2$ | 5.0 | 70.8 | 77.8 | 7.0 |
| 0.050% $H_2O_2$ | 5.0 | 70.8 | 76.1 | 5.3 |

From tables II and III, it is apparent that certain agents which are generally considered to be enzyme inactivators have no appreciable effect on Dextrinase A, a dextrose forming enzyme. Large amounts of NaOCl did significantly inactivate Dextrinase A but imparted phenollike odors and tastes to the finished syrup.

EXAMPLE III

This example illustrates the use of $ClO_2$ to inactivate glucoamylase in cornstarch hydrolysates at various pH levels and with various amounts of $ClO_2$.

An enzyme liquefied cornstarch slurry was prepared in the manner described in example I. One percent ground distillers' malt and 3 glucoamylase units per 100 g. of dry substance were added. The liquor was maintained at 55° C. and at a pH of 5 for three days. The resulting hydrolysate had a DE of 59 and was divided into five portions. The pH of the portions was adjusted to the values shown in table IV. Each of these portions was divided into 3 parts and to two of the three parts $ClO_2$ was added in amounts shown in table IV. The other parts served as controls. All the parts of the portions were maintained at 55° C. for 12 hours and the DE of each part determined. The results of this experiment are shown in table IV.

TABLE IV

| | | PPM $ClO_2$ | | | | |
|---|---|---|---|---|---|---|
| | None | | 200 | | 500 | |
| pH | DE | DE Increase | DE | DE Increase | DE | DE Increase |
| 2 | 58.5 | — | 59.4 | 0.4 | 59.0 | 0.0 |
| 3 | 61.9 | 2.9 | 59.4 | 0.4 | 59.2 | 0.2 |
| 4 | 62.2 | 3.2 | 61.2 | 2.2 | 59.4 | 0.4 |
| 5 | 61.2 | 2.2 | 61.4 | 2.4 | 59.4 | 0.4 |
| 6 | 60.1 | 1.1 | 59.8 | 0.8 | 59.4 | 0.4 |

From the above table, it is seen that generally as the pH of the hydrolysate is lowered the $ClO_2$ becomes more effective in inactivating the glucoamylase.

EXAMPLE IV

This example illustrates the inactivation of glucoamylase in a cornstarch hydrolysate by in situ generation of $ClO_2$ from $NaClO_2$.

An enzyme liquefied cornstarch slurry was prepared in the manner described in example I. One percent ground distillers' malt and 3 glucoamylase units per 100 g. dry substance were added. The liquor was maintained at 55° C. and at a pH of 5.4 for 22 hours. The resulting hydrolysate had a DE of 50.2 and was divided into 4 portions. The portions were treated in the manner shown in table V and maintained at 55° C. for 47.5 hours. The DE of the portions was determined after 23.5 hours and after 47.5 hours. The results of this experiment are shown below in table V.

TABLE V

| Treatment | DE | 23.5 hours After Treatment DE | 47.5 hours After Treatment DE |
|---|---|---|---|
| Control, pH 4.5 | 50.2 | 59.9 | 68.2 |
| Control, pH 3.0 adjusted with HCl | 50.2 | 58.4 | 64.3 |
| 0.1% $NaClO_2$, pH 3.0 | 50.2 | 50.8 | 50.8 |
| 0.05% $NaClO_2$, pH 3.0 | 50.2 | 51.9 | 52.0 |

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is;

1. A method of producing a dextrose containing syrup having a substantially predictable dextrose content comprising liquefying starch, incorporating into the liquefied starch a dextrose forming enzyme, subjecting the liquefied starch containing the dextrose forming enzyme to starch hydrolyzing conditions to provide a hydrolysate containing dextrose, treating the hydrolysate with a sufficient amount of $ClO_2$ to substantially inactivate the dextrose forming enzyme thereby obtaining a hydrolysate with a predictable dextrose content, and refining the treated hydrolysate to provide a dextrose containing syrup.

2. A method of producing a dextrose containing syrup having a substantially predictable dextrose content as defined in claim 1, wherein the starch is enzymatically liquefied.

3. A method of producing a dextrose containing syrup having a substantially predictable dextrose content as defined in claim 2, wherein the dextrose forming enzyme is glucoamylase.

4. A method of producing a dextrose containing syrup having a substantially predictable dextrose content as defined in claim 3, wherein the hydrolysate being treated with $ClO_2$ is at a temperature in the range of from about 40° to about 70° C.

5. A method of producing a dextrose containing syrup having a substantially predictable dextrose content as defined in claim 4, wherein the hydrolysate being treated with the $ClO_2$ has a pH in the range of from about 2.5 to about 4.5.

6. A method of producing a dextrose containing syrup having a substantially predictable dextrose content as defined in claim 5, wherein the amount of $ClO_2$ used for treating the hydrolysate is from about 60 to about 500 p.p.m. based upon the dry substance present in the hydrolysate.

7. A method of producing a dextrose containing syrup having a substantially predictable dextrose content as defined in claim 6, wherein the glucoamylase incorporated into the liquefied starch is produced from micro-organisms of the Aspergillus genus.

8. A method of producing a dextrose containing syrup having a substantially predictable dextrose content as defined in claim 7, wherein the temperature of the hydrolysate being treated with the $ClO_2$ is from about 50° to about 60° C. and the amount of $ClO_2$ used is from about 100 to 150 p.p.m. based upon the dry substance present in the hydrolysate.

9. A method of producing a dextrose containing syrup having a substantially predictable dextrose content as defined in claim 8, wherein the liquefied starch is also treated with a maltose forming enzyme in order to provide a hydrolysate with substantial quantities of maltose.

10. A method of treating a dextrose containing syrup having a substantially predictable dextrose content as defined in claim 8, wherein the hydrolysate is treated with $ClO_2$ when the hydrolysate contains from about 40 to 45 percent dextrose.

* * * * *